US008002999B2

(12) United States Patent
Chang

(10) Patent No.: US 8,002,999 B2
(45) Date of Patent: Aug. 23, 2011

(54) METHOD FOR MAKING STAMPER FOR PRESS MOLDING OPTICAL ARTICLES

(75) Inventor: Keng-Ming Chang, Taipei Hsien (TW)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 253 days.

(21) Appl. No.: 12/431,659

(22) Filed: Apr. 28, 2009

(65) Prior Publication Data

US 2010/0007960 A1    Jan. 14, 2010

(30) Foreign Application Priority Data

Jul. 14, 2008    (CN) .......................... 2008 1 0302721

(51) Int. Cl.
*B29D 11/00* (2006.01)
*B29C 33/40* (2006.01)

(52) U.S. Cl. ............ 216/26; 216/24; 264/129; 264/134; 264/219

(58) Field of Classification Search ............... 216/24, 216/26; 264/129, 134, 219
See application file for complete search history.

(56) References Cited

U.S. PATENT DOCUMENTS 7,094,304 B2 *    8/2006   Nystrom et al. .............. 156/242
7,255,438 B2 *    8/2007   Atkins et al. .................. 351/177

* cited by examiner

*Primary Examiner* — Shamim Ahmed
(74) *Attorney, Agent, or Firm* — Altis Law Group, Inc.

(57) ABSTRACT

An exemplary stamper includes molding portions arranged in an array. Each of the molding portions includes a central optical molding portion and an annular peripheral molding portion surrounding the central optical molding portion. Each molding portion is capable of facilitating formation of a respective optical article. A surface roughness of the annular peripheral molding portion is larger than a predetermined wavelength of light. The predetermined wavelength is selected according to a wavelength of light that is expected to be incident on the optical article when the optical article is in use.

7 Claims, 7 Drawing Sheets

METHOD FOR MAKING STAMPER FOR PRESS MOLDING OPTICAL ARTICLES

BACKGROUND

1. Technical Field

The present disclosure relates to press-molding of optical articles such as lenses; and particularly to a stamper for press-molding optical articles with improved optical performance, a method for making the stamper, and a lens made by the stamper.

2. Description of Related Art

Optical articles, such as lenses, are widely used in digital cameras, video recorders, compact disc players and other optical systems. Aspheric lenses are particularly popular due to their excellent optical performance. At present, an impression process is commonly employed for manufacturing optical articles. In the impression process, a stamper is generally used for molding the optical articles.

A typical stamper for manufacturing optical articles includes a smooth surface, whereby an optical article made by the stamper correspondingly has a smooth surface. However, because of the smooth surface of the optical article, light traveling to the optical article may easily be reflected by the smooth surface and form a glare. Such glare may interfere with the optical performance of the optical article.

Therefore, what is needed is a stamper for press-molding optical articles with improved optical performance, a method for making the stamper, and a lens made by the stamper.

DETAILED DESCRIPTION

Figure 6:
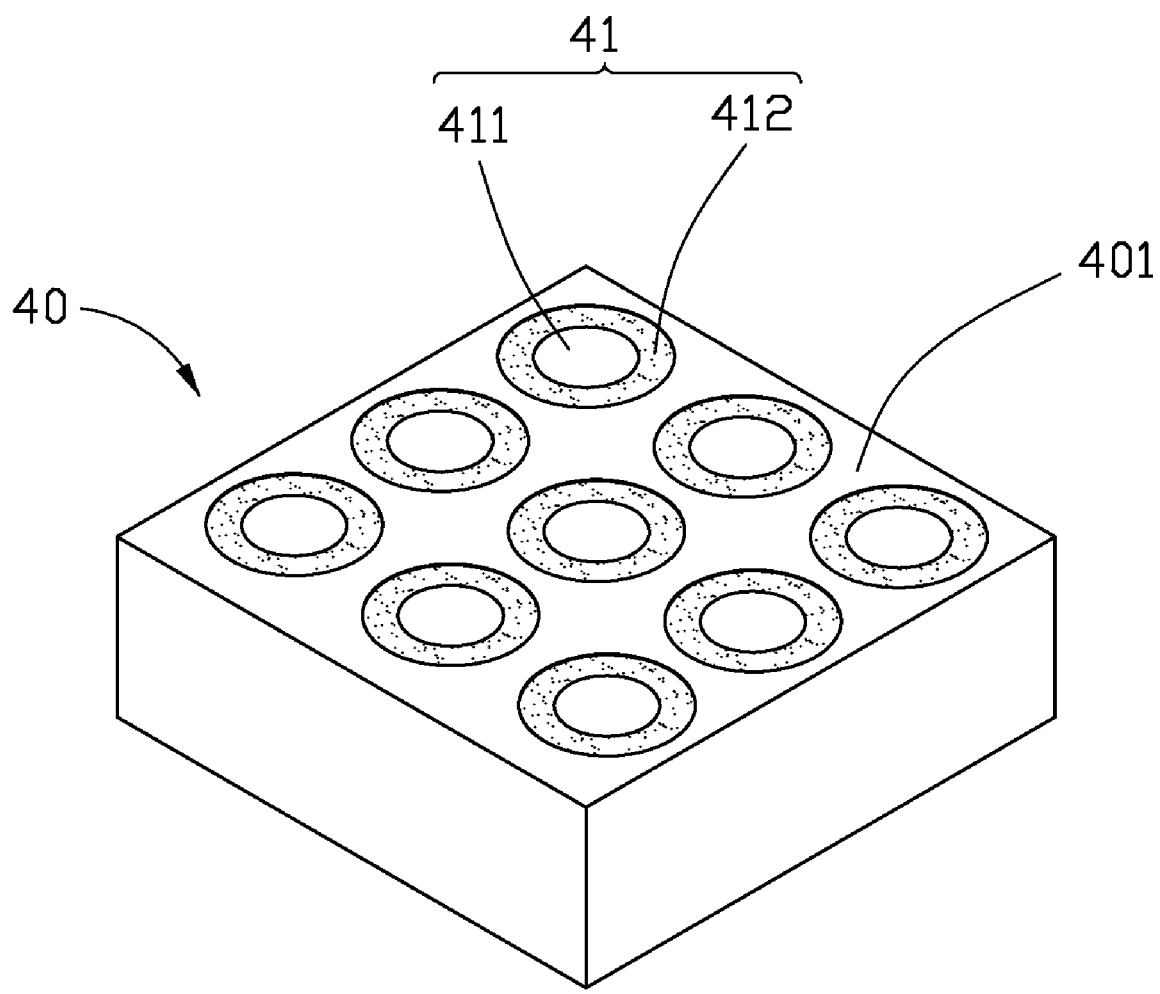
FIG. 6 is a schematic, isometric view of the stamper formed by the process illustrated in FIGS. 2-5.

FIG. 6 shows an exemplary stamper 40 that can be used in an impression process to form lenses. An exemplary method for manufacturing the stamper 40 is shown in FIG. 1.

Figure 1:
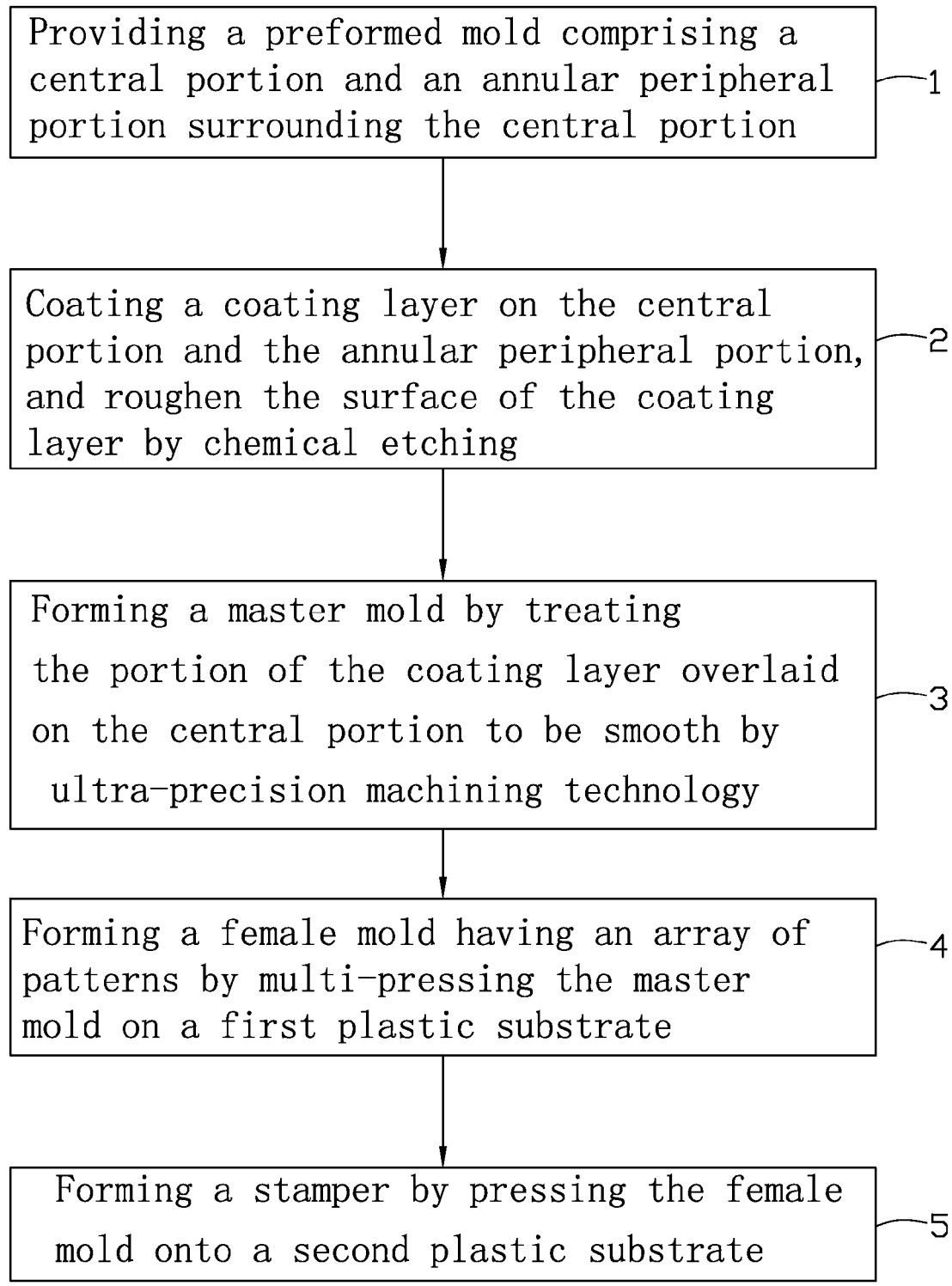
FIG. 1 is a flowchart of a method for manufacturing a stamper in accordance with an exemplary embodiment.
Figure 2:
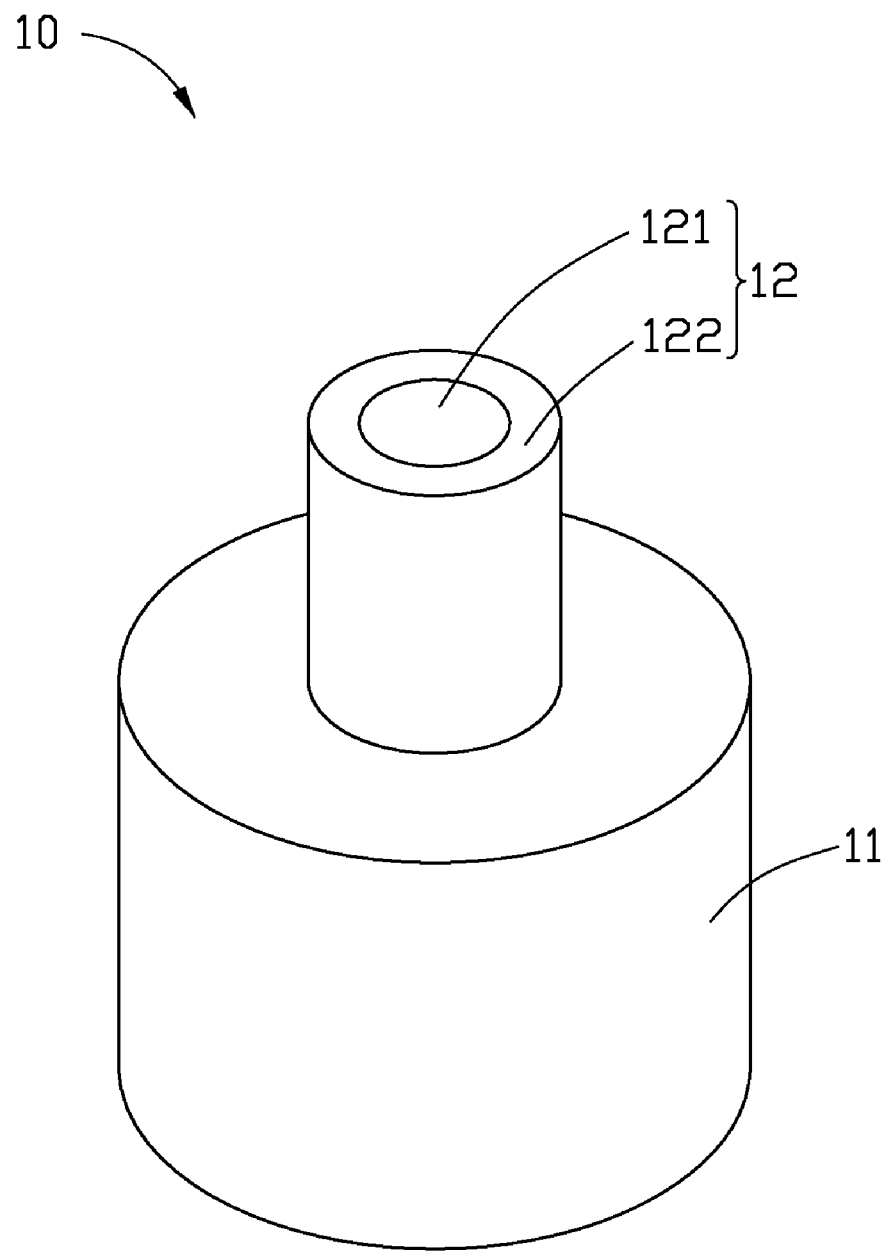
FIGS. 2 to 5 illustrate successive stages in a process for forming the stamper according to the method of FIG. 1.

Referring to FIG. 1 and also FIG. 2, in step 1, a preformed mold 10 is provided. In this embodiment, the preformed mold 10 is made of silicon carbide (SiC). In other embodiments, the preformed mold 10 can instead be made of tungsten carbide (WC), silicon nitride ($Si_3N_4$), titanium carbon (TiC), or tungsten carbide-cobalt (WC—Co) hard alloy.

The preformed mold 10 includes a main body 11. One end of the main body 11 includes an end face 12. The end face 12 is formed by ultra-precision machining technology. The end face 12 includes a central portion 121, and an annular peripheral portion 122 surrounding the central portion 121. In this embodiment, the central portion 121 is convex. In another embodiment, the central portion 121 can be concave.

Figure 3:
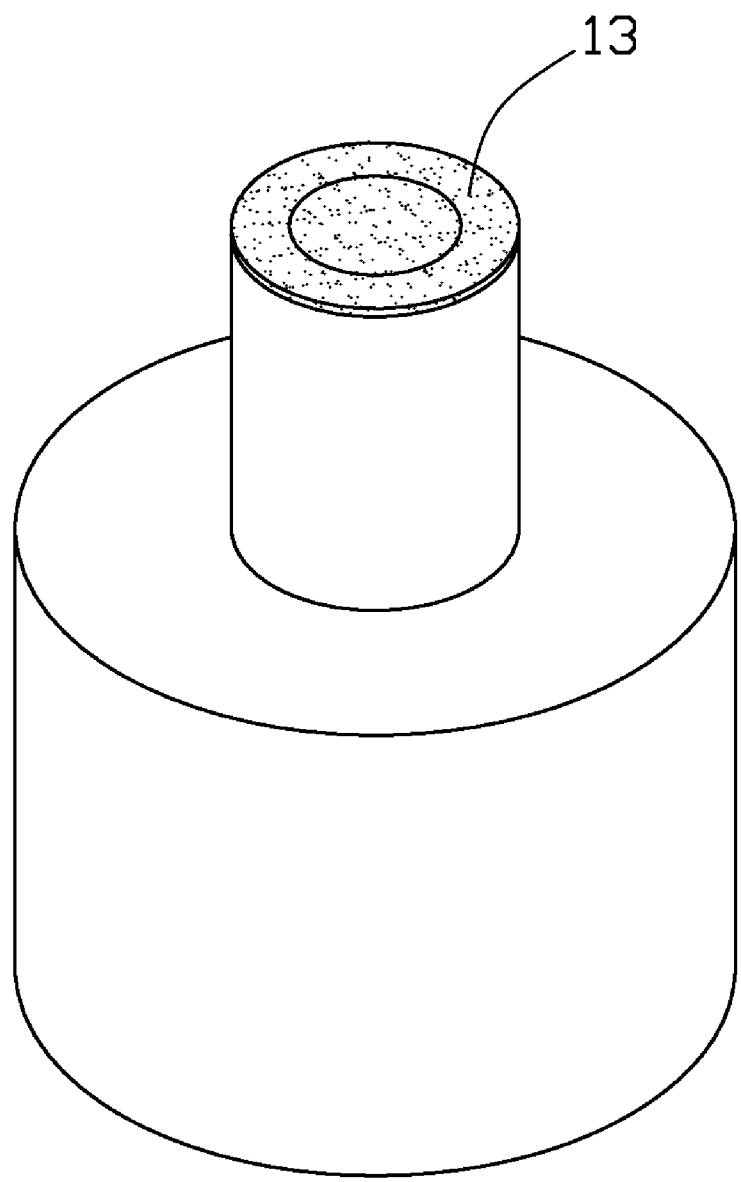

In step 2, referring also to FIG. 3, a coating layer 13 is coated on the end face 12. Then the surface of the coating layer 13 is treated by chemical etching so that the surface becomes rough. The thickness of the coating layer 13 is from about 0.2 millimeters to about 0.4 millimeters. The surface roughness of the coating layer 13 is larger than a predetermined wavelength of light. The predetermined wavelength is selected according to a wavelength of light that is expected to be incident on a lens formed by the finished stamper 40 when the lens is in use. In this embodiment, the coating layer 13 is made of nickel (Ni), and the thickness of the coating layer 13 is 0.3 millimeters. In other embodiments, the coating layer 13 can instead be made of chromium (Cr).

Figure 4:
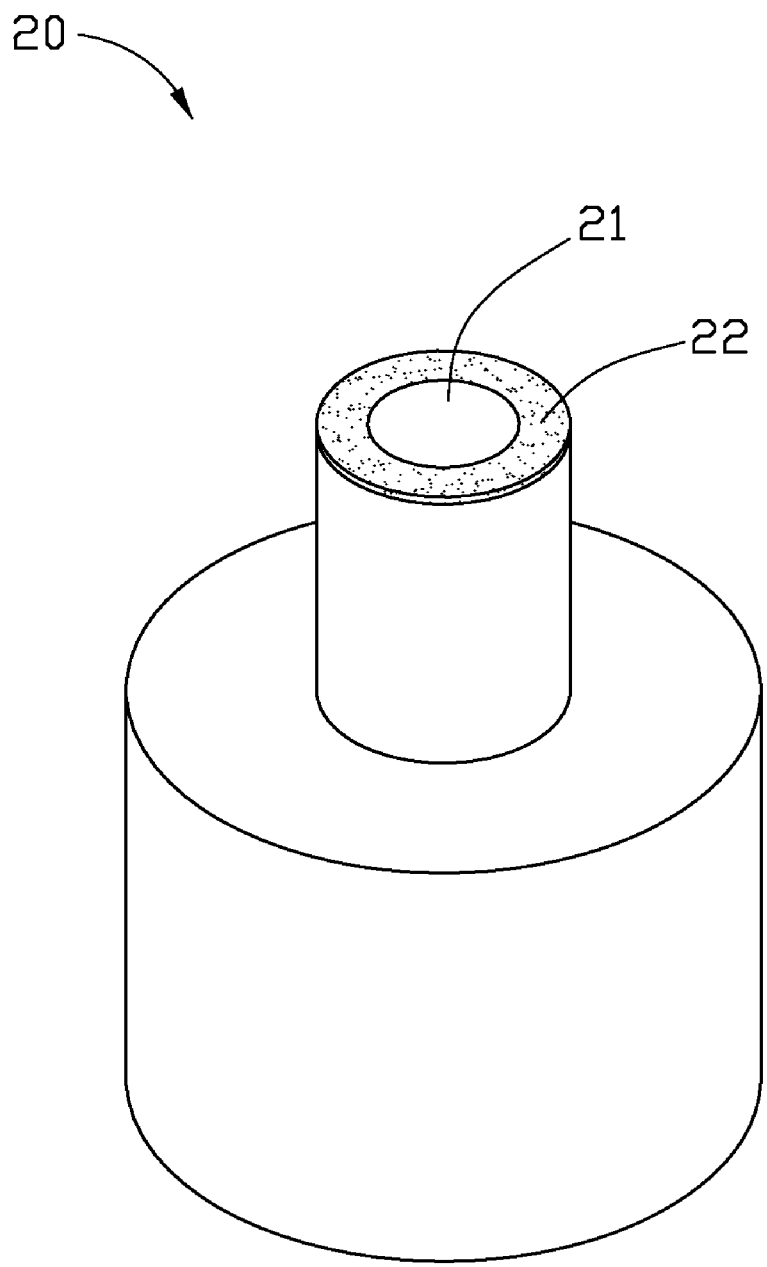

In step 3, referring also to FIG. 4, the portion of the coating layer 13 overlaid on the central portion 121 is treated to be smooth by ultra-precision machining technology to form a central molding portion 21. The rough portion of the coating layer 13 surrounding the central molding portion 21 is defined as an annular peripheral molding portion 22. The main body 11 having the central molding portion 21 and the annular peripheral molding portion 22 is defined as a master mold 20. In this embodiment, the central molding portion 21 is convex.

Figure 5:
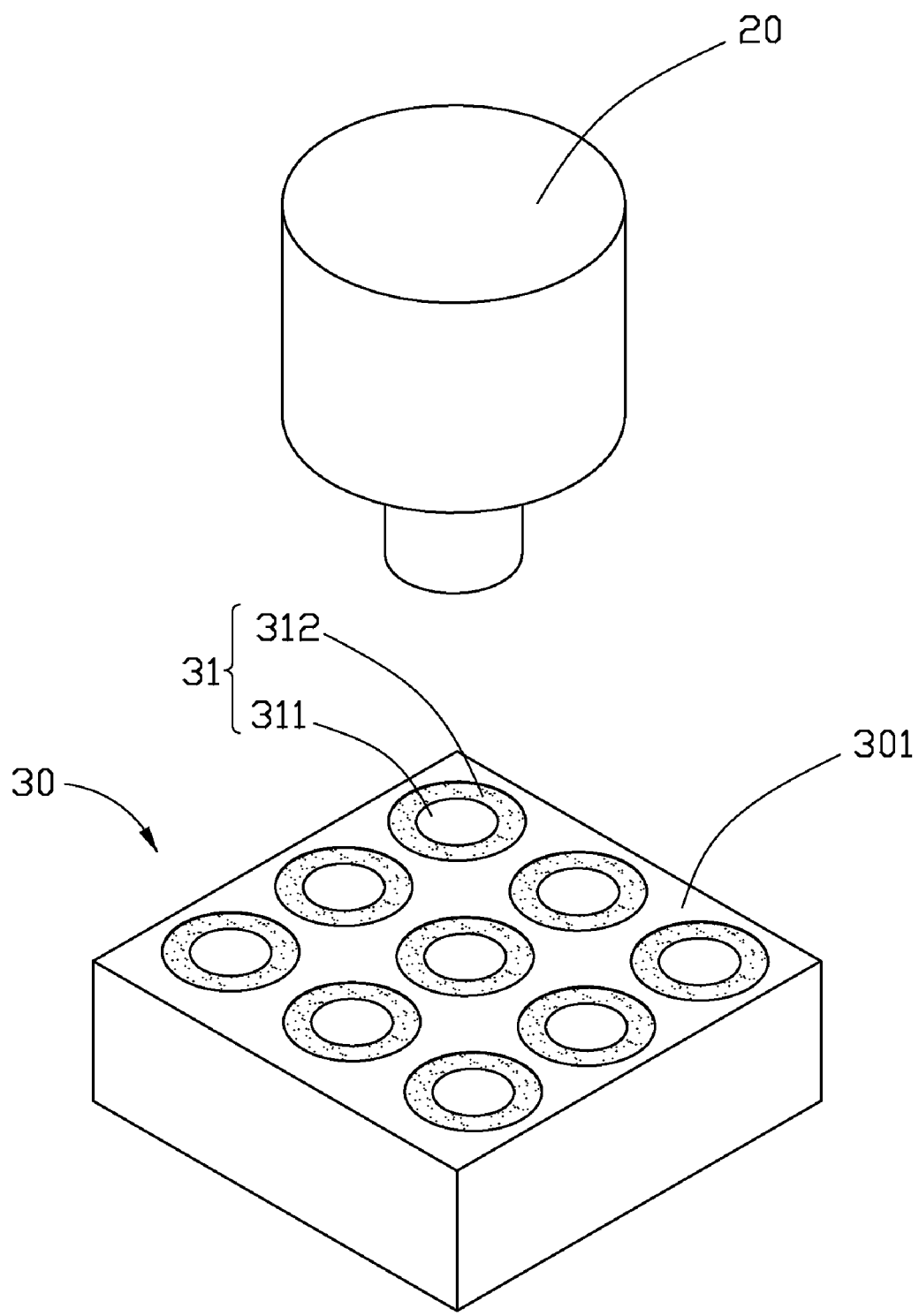

In step 4, referring also to FIG. 5, a female mold 30 having an array of patterns 31 is formed by multi-pressing the master mold 20 on a first plastic substrate 301. The patterns 31 are arranged on the female mold 30 in a regular matrix of rows and columns. Each pattern 31 includes a central portion 311, and an annular peripheral portion 312 surrounding the central portion 311. In this embodiment, the central portion 311, being made by the convex central molding portion 21, is correspondingly concave.

In step 5, referring also to FIG. 6, the stamper 40 is formed by using the female mold 30 in a transfer printing process. In the transfer printing process, the female mold 30 is pressed onto a second plastic substrate 401 having a lower glass transition temperature than the first plastic substrate 301. The stamper 40 is configured for manufacturing a lens array in an impression process. The stamper 40 includes molding portions 41 arranged in a regular matrix of rows and columns.

Each of the molding portions 41 includes a central optical molding portion 411, and an annular peripheral molding portion 412 surrounding the central optical molding portion 411. The size of the central optical molding portion 411 is substantially the same as the size of the central portion 311, and substantially the same as the size of the central molding portion 21. The shape of the central optical molding portion 411 is complementary to the shape of the central portion 311, and substantially the same as the shape of the central molding portion 21. Broadly speaking, the size and shape of the annular peripheral molding portion 412 are the same as the size and shape of the annular peripheral portion 312, and substantially the same as the size and shape of the annular peripheral molding portion 22. However, at a microscopic level, a rough surface of the annular peripheral molding portion 412 is shaped complementary to the rough surface of the annular peripheral portion 312. That is, the surface of the central optical molding portion 411 is smooth, and the surface of the annular peripheral molding portion 412 is rough. The surface roughness of the annular peripheral molding portion 412 is larger than the predetermined wavelength. In this embodiment, the central optical molding portion 411, being made by the concave central portion 311, is correspondingly convex.

Figure 7:
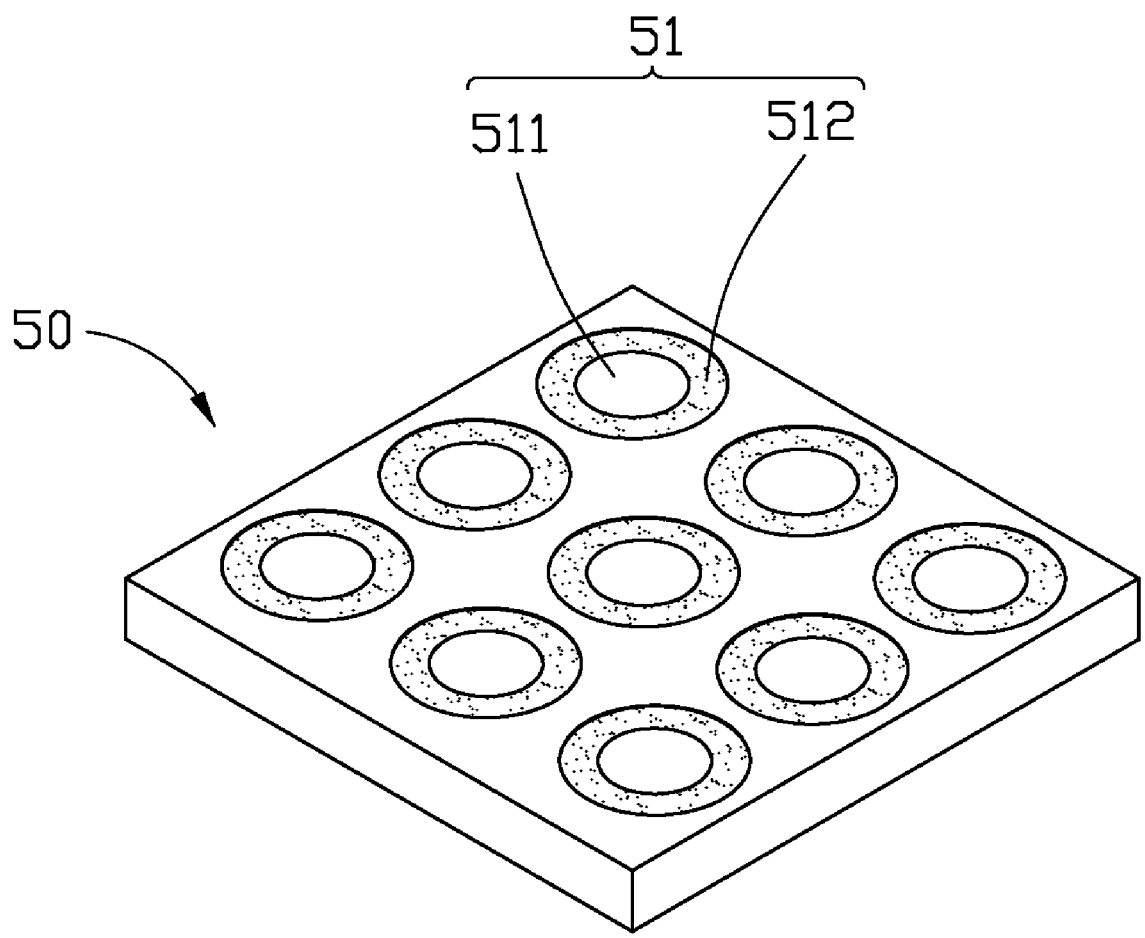
FIG. 7 is a schematic, isometric view of a lens array formed by the stamper of FIG. 6.

Referring to FIG. 7, a lens array 50 can be made by the stamper 40. The lens array 50 includes a plurality of lenses 51. Each lens 51 includes a central optical portion 511 configured for performing transmission, refraction and reflection of light passing therethrough, and an annular peripheral portion 512 surrounding the central optical portion 511. In this embodiment, the central optical portion 511, being made by a respective one of the convex central optical molding portions 411 of the stamper 40, is correspondingly concave.

Because the surface of each annular peripheral molding portion 412 has a surface roughness larger than the predetermined wavelength, the annular peripheral portion 512 made by the annular peripheral molding portion 412 correspondingly has a surface roughness larger than the predetermined wavelength. Therefore, the rough surface of the annular peripheral portion 512 of the lens 51 can scatter light rays. Thus in use of the lens 51, any glare that may be formed by reflected light rays can be reduced or even eliminated. Accordingly, the optical performance of the lens 51 can be improved.

While certain embodiments have been described and exemplified above, various other embodiments will be apparent to those skilled in the art from the foregoing disclosure. The disclosure is not limited to the particular embodiments described and exemplified but is capable of considerable variation and modification without departure from the scope of the appended claims.

What is claimed is:

1. A method for manufacturing a stamper, the method comprising:
   providing a preformed mold comprising a central portion and an annular peripheral portion surrounding the central portion;
   coating a coating layer on the central portion and the annular peripheral portion, and treating the surface of the coating layer by chemical etching to roughen the surface of the coating layer;
   forming a master mold by treating the portion of the coating layer overlaid on the central portion by ultra-precision machining process;
   forming a female mold having an array of patterns by multi-pressing the master mold on a first plastic substrate; and
   forming a stamper by pressing the female mold on a second plastic substrate.

2. The method of claim 1, wherein the preformed mold is comprised of material selected from the group consisting of SiC, WC, $Si_3N_4$, TiC, and WC—Co hard alloy.

3. The method of claim 1, wherein a surface roughness of the roughened coating layer is larger than a predetermined wavelength of light, and the predetermined wavelength is selected according to a wavelength of light that is expected to be incident on each of optical articles which can be formed by the stamper when the optical articles are in use.

4. The method of claim 3, wherein each of the optical articles comprises a lens.

5. The method of claim 1, wherein the coating layer is made of one of Ni and Cr.

6. The method of claim 1, wherein a thickness of the coating layer is in the range from about 0.2 millimeters to about 0.4 millimeters.

7. The method of claim 1, wherein the second plastic substrate has a lower glass transition temperature than that of the first plastic substrate.

* * * * *